(12) United States Patent
Rao et al.

(10) Patent No.: US 11,106,381 B2
(45) Date of Patent: Aug. 31, 2021

(54) AUTOMATED SEAMLESS MIGRATION OF LOGICAL STORAGE DEVICES

(71) Applicant: EMC IP Holding Company LLC, Hopkinton, MA (US)

(72) Inventors: Vinay G. Rao, Bangalore (IN); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 16/697,393

(22) Filed: Nov. 27, 2019

(65) Prior Publication Data
US 2021/0157502 A1  May 27, 2021

(51) Int. Cl.
G06F 3/06 (2006.01)

(52) U.S. Cl.
CPC ............ *G06F 3/0647* (2013.01); *G06F 3/061* (2013.01); *G06F 3/067* (2013.01); *G06F 3/0659* (2013.01); *G06F 3/0664* (2013.01)

(58) Field of Classification Search
CPC .................................................. G06F 3/0647
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,080,225 B1 * | 7/2006 | Todd | G06F 3/061 711/154 |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — David E Martinez
(74) *Attorney, Agent, or Firm* — Ryan, Mason & Lewis, LLP

(57) ABSTRACT

An apparatus comprises a host device configured to communicate over a network with first and second storage systems. The host device detects an association in at least one of the first and second storage systems between a source logical storage device of the first storage system and a target logical storage device of the second storage system, and responsive to the detected association, establishes a migration session in the host device for migration of the source logical storage device to the target logical storage device. The host device also obtains an indication from at least one of the first and second storage systems that a corresponding migration session has been activated in the first and second storage systems, and activates the previously-established migration session in the host device based at least in part on the obtained indication for migration of the source logical storage device to the target logical storage device.

20 Claims, 3 Drawing Sheets

(56) References Cited

U.S. PATENT DOCUMENTS

| | | | |
|---|---|---|---|
| 8,060,710 B1* | 11/2011 | Don | G06F 3/0617 |
| | | | 711/161 |
| 8,825,919 B1 | 9/2014 | Lim et al. | |
| 8,874,746 B1 | 10/2014 | Gonzalez | |
| 9,026,694 B1 | 5/2015 | Davidson et al. | |
| 9,400,611 B1 | 7/2016 | Raizen | |
| 9,594,780 B1 | 3/2017 | Esposito et al. | |
| 9,778,852 B1 | 10/2017 | Marshak et al. | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 2004/0010563 A1 | 1/2004 | Forte et al. | |
| 2006/0277383 A1 | 12/2006 | Hayden et al. | |
| 2008/0043973 A1 | 2/2008 | Lai et al. | |
| 2011/0197027 A1 | 8/2011 | Balasubramanian et al. | |
| 2011/0296230 A1 | 12/2011 | Chen et al. | |
| 2013/0080569 A1* | 3/2013 | Ueda | G06F 3/0613 |
| | | | 709/216 |
| 2015/0222705 A1 | 8/2015 | Stephens | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2018/0189635 A1 | 7/2018 | Olarig et al. | |
| 2019/0095299 A1 | 3/2019 | Liu et al. | |
| 2019/0108888 A1 | 4/2019 | Sarkar et al. | |

OTHER PUBLICATIONS

NVM Express, "NVM Express, Revision 1.3," NVM Express, May 1, 2017, 282 pages.

VMWare, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

U.S. Appl. No. 16/142,274 filed in the name of Sanjib Mallick et al. filed Sep. 26, 2018 and entitled "Host Device with Multi-Path Layer Implementing Automatic Standby Setting for Active-Active Configuration."

U.S. Appl. No. 15/795,653 filed in the name of Maneesh Pusalkar et al. filed Oct. 27, 2017 and entitled "Storage System with Network-Wide Configurable Device Names."

* cited by examiner

AUTOMATED SEAMLESS MIGRATION OF
LOGICAL STORAGE DEVICES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Different ones of the host devices can run different applications with varying workloads and associated TO patterns. Such host devices also generate additional TO operations in performing various data services such as migration. However, migration of logical storage volumes or other logical storage devices from one storage system to another storage system using conventional approaches typically requires either close cooperation between a host administrator and a storage administrator, or "spoofing" of source logical storage device identifiers by corresponding target logical storage devices. These requirements of conventional approaches can negatively impact the migration process and thereby degrade overall system performance. Accordingly, a need exists for improved migration techniques that can avoid such drawbacks of conventional approaches.

SUMMARY

Illustrative embodiments provide techniques for automated seamless migration of logical storage volumes or other types of logical storage devices between storage systems. Some embodiments can advantageously eliminate the need for coordination between host administrators and storage administrators, while also avoiding the need for spoofing of logical storage device identifiers.

In one embodiment, an apparatus comprises a host device configured to communicate over a network with first and second storage systems. The host device detects an association in at least one of the first and second storage systems between a source logical storage device of the first storage system and a target logical storage device of the second storage system, and responsive to the detected association, establishes a migration session in the host device for migration of the source logical storage device to the target logical storage device. The host device also obtains an indication from at least one of the first and second storage systems that a corresponding migration session has been activated in the first and second storage systems, and activates the previously-established migration session in the host device based at least in part on the obtained indication for migration of the source logical storage device to the target logical storage device.

The host device in some embodiments comprises a multi-path input-output (MPIO) driver configured to control delivery of input-output (IO) operations from the host device to the first and second storage systems over selected paths through the network. The MPIO driver is illustratively part of a multi-path layer provided by one or more host devices, such as multiple host devices that share the first and second storage systems.

The MPIO driver in such an embodiment is illustratively further configured to perform at least a portion of the detecting of the association, the establishing of the migration session in the host device, the obtaining of the indication and the activating of the previously-established migration session.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
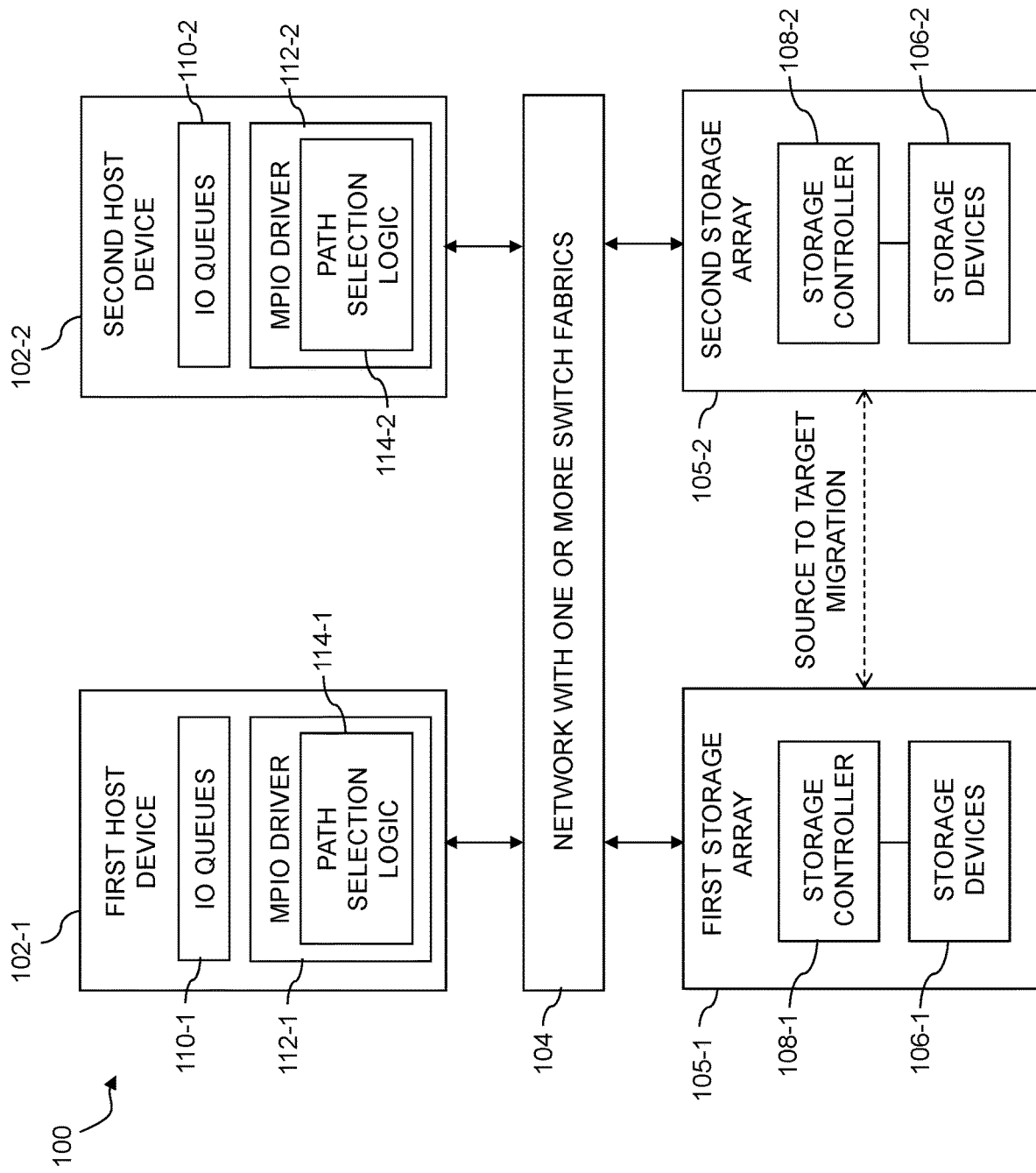
FIG. 1 is a block diagram of an information processing system configured with functionality for automated seamless migration utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric.

Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given 10 operation as that term is broadly used herein illustratively comprises one or more such commands. References herein to terms such as "input-output" and "10" should be understood to refer to input and/or output. Thus, an TO operation relates to at least one of input and output. For example, an TO operation can comprise at least one read TO operation and/or at least one write TO operation. More particularly, TO operations may comprise write requests and/or read requests directed to stored data of a given one of the storage arrays 105.

Each TO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "automated seamless migration" of logical storage devices of the storage arrays 105. Such automated seamless migration functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell EMC, suitably modified in the manner disclosed herein to support automated seamless migration of logical storage volumes. Other types of MPIO drivers from other driver vendors may be suitably modified to incorporate functionality for automated seamless migration as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of automated seamless migration functionality of host device 102-1. Other host device components, such as migration control logic implemented in one or more host device processors, can additionally or alternatively implement aspects of the automated seamless migration functionality of the host device 102-1. The disclosed embodiments are therefore not limited to embodiments in which automated seamless migration functionality is controlled at least in part by an MPIO driver or multi-path layer.

As indicated previously, migration of logical storage volumes or other logical storage devices from one storage system to another storage system using conventional approaches typically requires either close cooperation between a host administrator and a storage administrator, or "spoofing" of source logical storage device identifiers by corresponding target logical storage devices.

For example, host-based migration processes such as PowerPath® Migration Enabler (PPME) typically require a host administrator and a storage administrator to cooperate in setting up and executing the migration process, which in some circumstances can complicate the migration effort.

Storage-based migration processes such as Non-Destructive Migration (NDM) do not require such cooperation, but typically require device spoofing. More particularly, these storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver of a multi-path layer can merge the two device IDs into a single device ID for presentation to a host device processor layer, thereby avoiding the problems associated with spoofing, but as indicated above often require close coordination between a host administrator and a storage administrator. For example, in some cases the storage administrator creates the target devices and performs associated zoning and masking operations, while the host administrator initiates performance of the corresponding migrations.

These requirements of conventional approaches can negatively impact the migration process and thereby degrade overall system performance. However, as indicated previously, the automated seamless migration techniques of illustrative embodiments disclosed herein eliminate the need for coordination between host administrators and storage administrators, while also avoiding the need for spoofing of logical storage device identifiers.

In accordance with the automated seamless migration functionality, the host device 102-1 is configured to detect an association in at least one of the first and second storage arrays 105 between a source logical storage device of the first storage array 105-1 and a target logical storage device of the second storage array 105-2. The association is illustratively established responsive to one or more management commands directed to at least one of the first and second storage arrays 105 by a storage administrator. Such an association is also referred to herein as a "server-side" association, as it is established using actions that are taken on a storage-side of the system 100, illustratively by a storage administrator and without involvement of a host administrator. Other types of associations between source and target logical storage devices can be established in different ways in other embodiments.

Responsive to the detected association, the host device 102-1 establishes a migration session in the host device 102-1 for migration of the source logical storage device to the target logical storage device. Such "establishment" of a migration session in the host device 102-1 as that term and related terms are broadly used herein encompasses various arrangements in which a migration session is at least partially configured but is not activated, for example, to carry out actual copying of data from the source logical storage device to the target logical storage device. The host device 102-1 in establishing the migration session in the host device 102-1 for migration of the source logical storage device to the target logical storage device therefore illustratively pre-configures or otherwise at least partially configures, but does not activate, the migration session in the host device 102-1.

The host device 102-1 also obtains an indication from at least one of the first and second storage arrays 105 that a corresponding migration session has been activated in the first and second storage arrays 105. For example, the corresponding migration session is activated in the first and second storage arrays 105 in some embodiments responsive to one or more management commands directed to at least one of the first and second storage arrays 105 by a storage administrator. This is another storage-side action that can be taken by a storage administrator without involvement of a host administrator.

The host device 102-1 activates the previously-established migration session in the host device 102-1 based at least in part on the obtained indication for migration of the source logical storage device to the target logical storage device. Once activated, the migration session can be utilized to carry out actual copying of data from the source logical storage device to the target logical storage device. The copying of data is also referred to herein as being performed as part of a migration process. Such a migration process can encompass the activated migration session in the host device 102-1 as well as the corresponding migration session activated in the first and second storage arrays 105.

In some embodiments, detecting the association in at least one of the first and second storage arrays 105 more particularly involves the host device 102-1 sending a command to at least one of the first and second storage arrays 105, and detecting the association using information obtained from at least one of the first and second storage arrays 105 responsive to the command. The information obtained from at least one of the first and second storage arrays 105 responsive to the command illustratively comprises one or more designated pages stored in at least one of the first and second storage arrays 105 and read by the host device utilizing the command.

The command can include, for example, a mode sense command, an inquiry command or other types of SCSI or VU commands. For example, one possible alternative to use of a mode sense command in this context and other contexts herein involves use of a VU inquiry ("Inq") command.

In obtaining an indication from at least one of the first and second storage arrays 105 that a corresponding migration session has been activated in the first and second storage arrays 105, the host device 102-1 illustratively detects a notification from at least one of the first and second storage arrays 105, sends a command to at least one of the first and second storage arrays 105 responsive to the detected notification, and obtains the indication that the corresponding migration session has been activated in information obtained from at least one of the first and second storage arrays 105 responsive to the command.

For example, the notification can comprise a check condition ("chk_cond") notification and the command can comprise an inquiry command generated in response to the check condition notification.

In some embodiments, the indication comprises a migration counter value obtained by the host device 102-1 responsive to the command, with the migration counter value being indicative of whether or not the corresponding migration session has been activated in the first and second storage arrays 105. The migration counter in an embodiment of this type is illustratively a non-decrementing counter that is incremented in conjunction with activation of the migration session in the first and second storage arrays 105.

As indicated above, activation of the previously-established migration session in the host device 102-1 based at least in part on the obtained indication illustratively causes a migration process to be performed in which data is copied from the source logical storage device to the target logical storage device.

The migration process can include, for example, a storage-based migration process in which the first storage array 105-1 controls the copying of the data from the first storage array 105-1 to the second storage array 105-2, illustratively with no significant involvement of the host device 102-1 in the migration process.

As another example, the migration process can include a host-based migration process in which the first storage array 105-1 controls the copying of the data from the first storage array 105-1 to the second storage array 105-2, but with significant involvement of the host device 102-1 in the migration process. For example, the MPIO driver 112-1 of the host device 102-1 can initiate the data copying.

Other types of migration processes involving at least one of the host device 102-1 and the storage arrays 105 can be used in other embodiments.

The host device 102-1 is further configured to obtain, in conjunction with the migration process, an indication from the second storage array 105-2 that the first and second storage arrays 105 have achieved synchronization with respect to the migration of the source logical storage device to the target logical storage device, and to commit to utilization of the target logical storage device responsive to the indication. Once committed to utilizing the target logical storage device, the host device 102-1 no longer utilizes the source logical storage device.

Multiple host devices 102 can be similarly notified that they should commit to the utilization of the target logical storage device, once the first and second storage arrays 105 have achieved synchronization with respect to the migration of the source logical storage device to the target logical storage device.

For example, each of the host devices 102 is illustratively configured to obtain a notification from at least one of the first and second storage arrays 105 directing that the host device move from utilization of the source logical storage device to utilization of the destination logical storage device.

After all of the host devices 102 using the source logical storage device have committed in the manner described above to utilization of the target logical storage device, the migration from source to target is considered fully complete, and the source logical storage device can therefore be removed or otherwise deleted from the system 100.

Accordingly, in some embodiments, at least one of the first and second storage arrays 105 will notify all of the host devices 102 that are working with the source logical storage device to instead start working with the target logical storage device. This is illustratively achieved by a given one of the storage arrays 105 issuing a check condition notification or other type of notification at a particular point in time to each of the host devices 102, even if that host device is turned off or in a "sleep" state. Any such host device will address the notification when it is later turned on or "wakes up," such that it will automatically start working with the target logical storage device instead of the source logical storage device.

Such features are examples of what is more generally referred to herein as "automated seamless migration" of logical storage devices. Illustrative embodiments are "automated" in that no coordination between a host administrator and a storage administrator is required, and are also "seamless" in that each host device seamlessly transitions from usage of the source logical device to usage of the target logical device at an appropriate time, without the need for any synchronization between multiple host devices. Other advantages are provided by other automated seamless migration arrangements in other embodiments.

In some embodiments, the source logical device comprises a non-paired or "local only" logical device and the destination logical device comprises a paired logical device. Such a paired logical device is illustratively established in accordance with an active-active configuration of the first and second storage arrays 105, and is identified by the MPIO driver 112-1 as a single logical device but has separate corresponding logical devices on the respective first and second storage arrays. Migration from a non-paired logical device to a paired logical device can be implemented, for example, in order to achieve a high availability arrangement for the data of the migrated logical device, with the migrated logical device being accessible on both of the storage arrays 105. These and numerous alternative data movement scenarios or more generally other types of migration scenarios can be similarly configured to utilize automated seamless migration techniques as disclosed herein.

The above-described functions associated with automated seamless migration functionality of the host device 102-1 are illustratively carried out at least in part utilizing the MPIO driver 112-1 and its path selection logic 114-1. For example, in some embodiments, the seamless migration functionality can be implemented substantially entirely under the control of the MPIO driver 112-1, and in such embodiments the path selection logic 114-1 is illustratively configured to control performance of the steps of the flow diagram to be described below in conjunction with FIG. 2. Additional or alternative host device components, such as migration control logic implemented in the host device, can be used to control performance of an automated seamless migration process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed automated seamless migration functionality. Accordingly, aspects of automated seamless migration functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support automated seamless migration.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the automated seamless migration functionality.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of systems comprising one or more host devices and first and second storage systems. The first and second storage systems in this embodiment are assumed to comprise respective first and second storage arrays, possibly but not necessarily arranged in an active-active configuration, with each storage array comprising a plurality of storage devices. The storage devices of the first and second storage arrays are assumed to include logical storage devices such as LUNs or other logical storage volumes.

Figure 2:
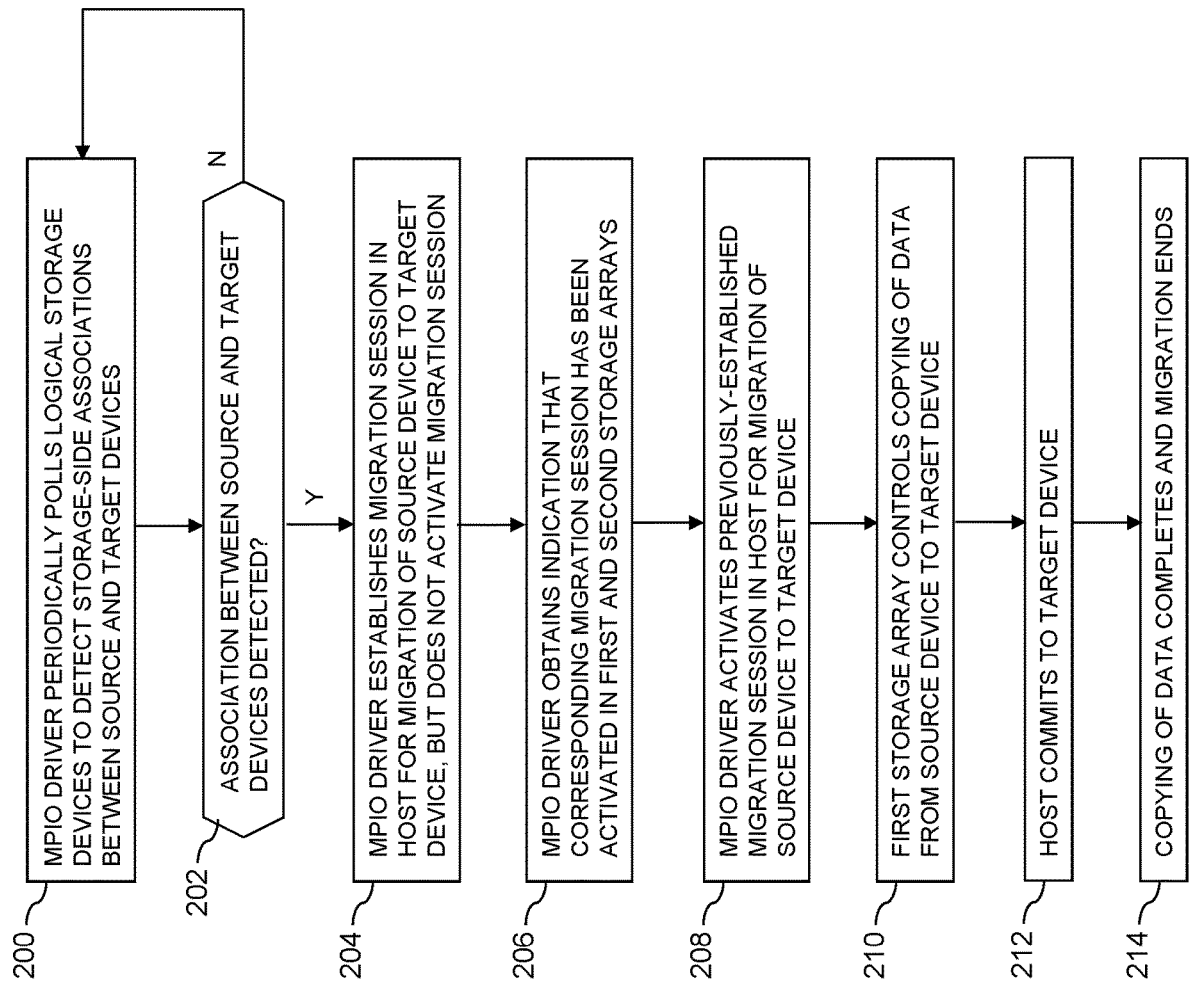
FIG. 2 is a flow diagram of a process for automated seamless migration utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1.

In step 200, the MPIO driver in the first host device periodically polls logical storage devices to detect one or more storage-side associations between respective pairs of source and target devices. The source and target devices illustratively comprise respective logical storage devices on respective ones of the first and second storage arrays, although other arrangements are possible. Such periodic polling illustratively comprises sending one or more commands to the corresponding storage arrays, and detecting a given association using information obtained from at least one of the first and second storage arrays responsive to the commands. For example, as indicated elsewhere herein, the commands can include mode sense commands, inquiry commands or other types of SCSI or VU commands. The information obtained from at least one of the first and second storage arrays responsive to the commands comprises one or more designated pages stored in at least one of the first and second storage arrays and read by the host device utilizing the commands.

In step 202, a determination is made as to whether or not an association has been detected between at least one pair of source and target devices. Such an association in the present embodiment is also referred to as a "storage-side" association, as it is illustratively an association that is established between the source and target devices by a storage administrator or other storage-side user. Other types of associations between source and target devices can be detected in other embodiments. If no such association has been detected, the process returns to step 200 as indicated. Otherwise, the process moves to step 204. It will be assumed without limitation for further description of steps 204 through 214 that detection of an association is detection of a single association, although it is to be appreciated that multiple such associations can be detected in step 202, with different instances of steps 204 through 214 being performed for each such detected association.

In step 204, the MPIO driver establishes a migration session in the host device for migration of the source device to the target device, but does not activate the migration session. These and other similar references herein to "establishing" of a migration session are intended to be broadly construed so as to encompass, for example, configuring of the migration session, including performance of one or more associated operations up to but not including activation of the migration session. An "established migration session" in this embodiment illustratively refers to a migration session that has been configured at least in part by the MPIO driver, possibly in collaboration with other host device components, in that one or more parameters or other features of the migration session have been established, but the migration session has not yet been activated for copying of data from the source device to the target device. A given such established migration session can therefore be subsequently activated, as is done in step 208 below.

In step 206, the MPIO driver obtains an indication that a corresponding migration session has been activated in the first and second storage arrays. For example, the MPIO driver can obtain an indication from at least one of the first and second storage arrays that a corresponding migration session has been activated in the first and second storage arrays by detecting a notification from at least one of the first and second storage arrays, sending a command to at least one of the first and second storage arrays responsive to the detected notification, and obtaining the indication that the corresponding migration session has been activated as at least a portion of information obtained from at least one of the first and second storage arrays responsive to the command. The notification in such an embodiment illustratively comprises a check condition notification and the command illustratively comprises an inquiry command, although other types of notifications and commands can be used. The obtained indication can comprise, for example, a migration counter value obtained by the host device responsive to the command, with the migration counter value being indicative of whether or not the corresponding migration session has been activated in the first and second storage arrays.

In step 208, the MPIO driver activates the previously-established migration session in the host device for migration of the source device to the target device. As a result of such activation, copying of data from the source device to the target device can now proceed within the system, illustratively under the control of the first storage array, through interaction with the second storage array, and possibly but not necessarily with at least some involvement of the host device in the data copying portion of the migration process.

In step 210, the first storage array controls copying of data from the source device to the target device.

In step 212, the host device commits to the target device. Once the host device has committed to the target device, it will no longer utilize the source device. Any other host devices utilizing the source device can similarly commit to the target device, as described in more detail elsewhere herein.

In step 214, the copying of data from the source device to the target device completes and the migration ends.

Although not explicitly indicated in the figure, the process at this point can return to step 200 to continue the periodic polling of logical storage devices.

After all host devices have committed to the target device, the source device can be removed or otherwise deleted from the system.

As indicated above, different instances of the FIG. 2 process can execute at least in part in parallel with one another for different pairs of source and target devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated seamless migration functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated seamless migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
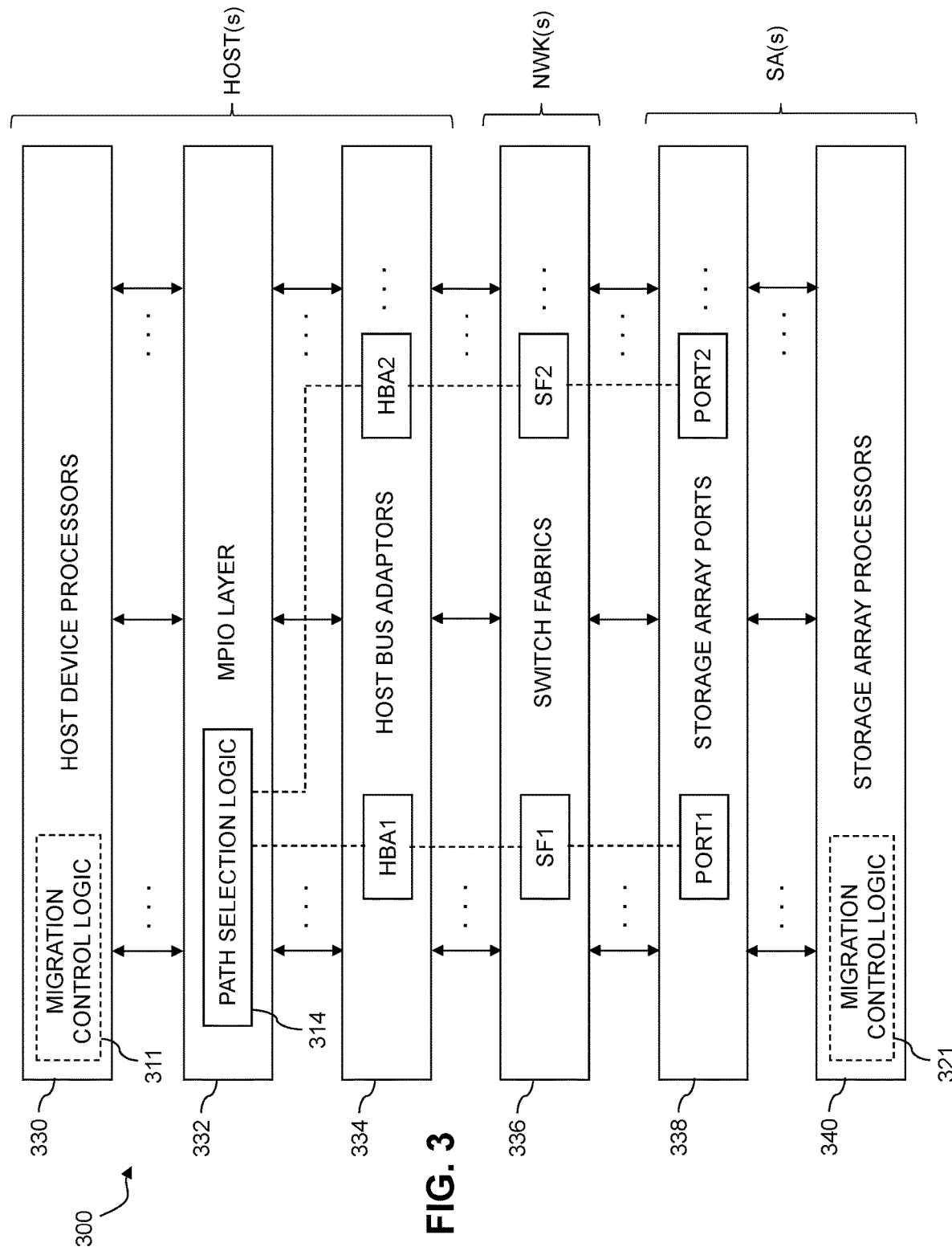
FIG. 3 is a block diagram showing multiple layers of a layered system architecture that includes a multi-path layer with automated seamless migration functionality in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated seamless migration of logical storage volumes or other logical storage devices. The logical storage devices store data for one or more application processes running in one or more host device processors of the host device processor layer 330. The automated seamless migration functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for automated seamless migration of logical storage devices as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the functionality for automated seamless migration of logical storage devices as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for automated seamless migration, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Another example of an automated seamless migration process implemented utilizing an MPIO layer such as MPIO layer 332 of the FIG. 3 embodiment will now be described in more detail. In this example, automated seamless migration of a source logical storage device of a first storage array to a target logical storage device of a second storage array is provided. The source and target logical storage devices are referred to as simply source and target devices in the following description. Similarly, the first and second storage arrays are also referred to as respective source and target arrays.

The process in the present example comprises an algorithm performed by multiple host devices and the source and target arrays, with the host devices utilizing their respective MPIO drivers. It is assumed that each of the host devices that interacts with a logical device to be migrated separately performs the host device portions of the process. The process includes the following steps:

1. The source array has a logical device that has a device ID given by ID1. This device is also referred to as device ID1.

2. A storage administrator provisions a new target array and associated logical storage devices, including a logical storage device that has a device ID given by ID2. This device is also referred to as device ID2. It is assumed that device ID2 has the same or a larger storage capacity than device ID1.

3. Assume that the storage administrator would like to migrate device ID1 as a source device on the source array to device ID2 as a target device on the target array, in a manner that ensures that all of the host devices currently using device ID1 will automatically and seamlessly transition to use of device ID2 instead of device ID1 at appropriate times, without the need for any host administrator involvement.

4. The storage administrator issues one or more array management commands to establish an association between device ID2 and device ID1 such that the target array is aware that device ID2 is a migration target for device ID1. This is assumed to be a storage-side association that is established without any interaction with the host administrator.

5. The target array updates one or more mode sense pages associated with device ID2 to indicate that the above-noted storage-side association has been established between device ID2 and device ID1.

6. The MPIO drivers of the respective host devices each periodically poll the mode sense pages of the storage arrays to determine if any other device such as device ID2 has become associated with a device such as device ID that the MPIO driver is already utilizing. It is assumed that the MPIO drivers are each configured with a designated polling period that is appropriate to the particular requirements of the overall system.

7. When a given one of the MPIO drivers detects the storage-side association between device ID1 and device ID2, that MPIO driver establishes a migration session from device ID1 as the source device to device ID2 as the target device, but does not activate that migration session. This migration session may comprise, for example, a PPME migration session of the type described elsewhere herein.

8. The target array maintains a migration counter that is readable by the host devices via an inquiry command or other type of command. The migration counter is initiated to a zero value when the target array is first brought online, and is incremented when a migration session is activated. The migration counter is illustratively a never-decrementing counter, and each increment of the migration counter is an indication that a different migration session has been activated.

9. The storage administrator issues one or more array management commands to activate a migration session between the source and target arrays in order to migrate device ID1 to device ID2.

10. The target array increments its migration counter responsive to the activation of the migration session between the source and target arrays, and reports a check condition ("chk_cond") notification in conjunction with the next IO operation received from each of the host devices.

11. When a given one of the MPIO drivers receives the check condition notification, that MPIO device sends an inquiry command or other type of command to read the current value of the migration counter from the target array. For example, a mode sense command or a VU command could be used in place of an inquiry command. Other commands or combinations of commands can be used in this context and other contexts herein where a host device or its associated MPIO driver obtains information from a storage array. It should be noted that in some operating systems, the MPIO driver will receive the notification in the form of an IO operation failure notification, and in such cases will send a preliminary command to determine what led to the IO operation failure, at which point it can send the above-noted command to read the current value of the migration counter. If the current value of the migration counter has been incremented relative to its previous value, the MPIO driver activates the previously-established migration session.

12. Data migration from device ID1 to device ID2 then begins. The migration process including the data copying will vary depending upon whether host-based or storage-based migration techniques are being utilized. For example, in a storage-based migration context such as the previously-mentioned NDM, the data is copied from the source array to the target array without any significant involvement of the host device. On the other hand, in a host-based migration context such as the previously-mentioned PPME, the MPIO driver will set up the data copy, but then the data is copied from the source array to the target array without further involvement of the host device. Accordingly, in these embodiments, the host device does not perform the data copying.

13. During the data copying portion of the migration process, the host devices communicate with device ID2 rather than with device ID1. If an IO operation is directed to a data page of device ID2 that has not yet been migrated from device ID1, the target array will obtain that data page from the source array, using a "copy on access" approach.

14. Once the target array verifies that it is in synchronization with the source array in the migration process, it issues another check condition notification to all of the host devices that are working with device ID2, which provides an indication to the host devices that they can now commit to device ID2. Again, multiple communications may be needed in some operating systems for the MPIO driver to detect the check condition notification indicative of migration synchronization between the source and target arrays. The MPIO driver responsive to this detection commits to device ID2 and "unconfigures" or otherwise breaks down its previous paths to device ID1. Each of the MPIO devices can perform this detection and commitment at different times, as some devices may be, for example, turned off or in a "sleep" state when the check condition notification is issued by the target array.

15. The storage administrator will query the target array to find out when all of the MPIO drivers have committed to device ID2. If there are multiple source devices being migrated to respective multiple target devices within the same migration process, the storage administrator will query the target array to find out when all of the MPIO drivers have committed to all of the target devices. The migration process then completes.

16. The storage administrator performs zoning and masking operations in order to un-zone and un-mask device ID from all host devices.

17. At this point, all host devices have been automatically transitioned to utilization of device ID2 which has been seamlessly migrated from device ID1, without device ID2 spoofing device ID1.

The process in the above example illustratively provides beneficial workforce separation by avoiding the need for coordination between host administrators and storage administrators, while also avoiding the need for spoofing of logical storage device identifiers. Moreover, the process ensures that multiple host devices using the source device being migrated will each transition to use of the target device at an appropriate time without the need for explicit synchronization of the multiple host devices.

A similar process is assumed to be performed by any other MPIO drivers on any respective other host devices.

Again, the above process and other processes herein can utilize additional or alternative steps, and certain steps illustrated as being performed serially can instead be performed at least in part in parallel with one another.

Some embodiments include only a single host devices, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular automated seamless migration arrangements described above are presented by way of illustrative example only. Numerous alternative arrangements of these and other features can be used in implementing automated seamless migration in other embodiments.

The illustrative embodiments disclosed herein can provide a number of significant advantages relative to conventional arrangements. For example, some embodiments configure a host device comprising an MPIO driver to include functionality for automated seamless migration of logical storage volumes or other types of logical storage devices between storage arrays or other types of storage systems.

These embodiments can advantageously eliminate the need for coordination between host administrators and storage administrators in performing migrations, while also avoiding the need for spoofing of logical storage device identifiers.

Moreover, some embodiments can ensure that multiple host devices using the source device being migrated will each transition to use of the target device at an appropriate time without the need for explicit synchronization of the multiple host devices.

Illustrative embodiments considerably facilitate data migration across storage arrays, leading to improved overall performance.

The disclosed functionality can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU)

or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated automated seamless migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
the host device being configured to communicate over a network with first and second storage systems;
the host device being further configured:
to detect an association in at least one of the first and second storage systems between a source logical storage device of the first storage system and a target logical storage device of the second storage system;
responsive to the detected association, to establish a migration session in the host device for migration of the source logical storage device to the target logical storage device;
to obtain an indication from at least one of the first and second storage systems that a corresponding migration session has been activated in the first and second storage systems; and
to activate the migration session established in the host device based at least in part on the obtained indication for migration of the source logical storage device to the target logical storage device;
wherein obtaining an indication from at least one of the first and second storage systems that a corresponding migration session has been activated in the first and second storage systems comprises:
detecting a notification from at least one of the first and second storage systems; and
obtaining the indication based at least in part on the detected notification.

2. The apparatus of claim 1 wherein the host device further comprises a multi-path input-output driver configured to control delivery of input-output operations from the host device to the first and second storage systems over selected paths through the network, and wherein the multi-path input-output driver is further configured to perform at least a portion of the detecting of the association, the establishing of the migration session in the host device, the obtaining of the indication and the activating of the migration session established in the host device.

3. The apparatus of claim 1 wherein the association in at least one of the first and second storage systems between the source logical storage device of the first storage system and the target logical storage device of the second storage system is established responsive to one or more management commands directed to at least one of the first and second storage systems by a storage administrator.

4. The apparatus of claim 1 wherein detecting the association in at least one of the first and second storage systems comprises:
sending a command to at least one of the first and second storage systems;

detecting the association using information obtained from at least one of the first and second storage systems responsive to the command.

5. The apparatus of claim 4 wherein the information obtained from at least one of the first and second storage systems responsive to the command comprises one or more designated pages stored in at least one of the first and second storage systems and read by the host device utilizing the command.

6. The apparatus of claim 1 wherein establishing the migration session in the host device for migration of the source logical storage device to the target logical storage device comprises configuring but not activating the migration session in the host device.

7. The apparatus of claim 1 wherein obtaining the indication based at least in part on the detected notification comprises:
sending a command to at least one of the first and second storage systems responsive to the detected notification; and
obtaining the indication that the corresponding migration session has been activated as at least a portion of information obtained from at least one of the first and second storage systems responsive to the command.

8. The apparatus of claim 7 wherein the notification comprises a check condition notification and the command comprises an inquiry command.

9. The apparatus of claim 7 wherein the indication comprises a migration counter value obtained by the host device responsive to the command, with the migration counter value being indicative of whether or not the corresponding migration session has been activated in the first and second storage systems.

10. The apparatus of claim 1 wherein the corresponding migration session is activated in the first and second storage systems responsive to one or more management commands directed to at least one of the first and second storage systems by a storage administrator.

11. The apparatus of claim 1 wherein activation of the migration session established in the host device based at least in part on the obtained indication causes a migration process to be performed in which data is copied from the source logical storage device to the target logical storage device.

12. The apparatus of claim 11 wherein the migration process comprises one of:
a storage-based migration process in which the first storage system controls the copying of the data from the first storage system to the second storage system; and
a host-based migration process in which the first storage system controls the copying of the data from the first storage system to the second storage system.

13. The apparatus of claim 11 wherein the host device is further configured to obtain, in conjunction with the migration process, an indication from the second storage system that the first and second storage systems have achieved synchronization with respect to the migration of the source logical storage device to the target logical storage device, and to commit to utilization of the target logical storage device responsive to the indication.

14. The apparatus of claim 1 further comprising one or more additional host devices each configured to communicate over the network with the first and second storage systems, and wherein each of the host devices is further configured to obtain a notification from at least one of the first and second storage systems directing that host device to move from utilization of the source logical storage device to utilization of the destination logical storage device.

15. A method performed by a host device configured to communicate over a network with first and second storage systems, comprising:
detecting an association in at least one of the first and second storage systems between a source logical storage device of the first storage system and a target logical storage device of the second storage system;
responsive to the detected association, establishing a migration session in the host device for migration of the source logical storage device to the target logical storage device;
obtaining an indication from at least one of the first and second storage systems that a corresponding migration session has been activated in the first and second storage systems; and
activating the migration session established in the host device based at least in part on the obtained indication for migration of the source logical storage device to the target logical storage device;
wherein obtaining an indication from at least one of the first and second storage systems that a corresponding migration session has been activated in the first and second storage systems comprises:
detecting a notification from at least one of the first and second storage systems; and
obtaining the indication based at least in part on the detected notification;
wherein the host device comprises a processor coupled to a memory.

16. The method of claim 15 wherein the host device further comprises a multi-path input-output driver configured to control delivery of input-output operations from the host device to the first and second storage systems over selected paths through the network, and wherein the multi-path input-output driver is further configured to perform at least a portion of the detecting of the association, the establishing of the migration session in the host device, the obtaining of the indication and the activating of the migration session established in the host device.

17. The method of claim 15 wherein detecting the association in at least one of the first and second storage systems comprises:
sending a command to at least one of the first and second storage systems;
detecting the association using information obtained from at least one of the first and second storage systems responsive to the command.

18. A computer program product comprising a non-transitory processor-readable storage medium having stored therein program code of one or more software programs, wherein the program code, when executed by a host device comprising a processor coupled to a memory and configured to communicate over a network with first and second storage systems, causes the host device:
to detect an association in at least one of the first and second storage systems between a source logical storage device of the first storage system and a target logical storage device of the second storage system;
responsive to the detected association, to establish a migration session in the host device for migration of the source logical storage device to the target logical storage device;

to obtain an indication from at least one of the first and second storage systems that a corresponding migration session has been activated in the first and second storage systems; and to activate the migration session established in the host device based at least in part on the obtained indication for migration of the source logical storage device to the target logical storage device;

wherein obtaining an indication from at least one of the first and second storage systems that a corresponding migration session has been activated in the first and second storage systems comprises:

detecting a notification from at least one of the first and second storage systems; and obtaining the indication based at least in part on the detected notification.

19. The computer program product of claim 18 wherein the host device further comprises a multi-path input-output driver configured to control delivery of input-output operations from the host device to the first and second storage systems over selected paths through the network, and wherein the multi-path input-output driver is further configured to perform at least a portion of the detecting of the association, the establishing of the migration session in the host device, the obtaining of the indication and the activating of the migration session established in the host device.

20. The computer program product of claim 18 wherein detecting the association in at least one of the first and second storage systems comprises:

sending a command to at least one of the first and second storage systems;

detecting the association using information obtained from at least one of the first and second storage systems responsive to the command.

* * * * *